United States Patent
Kubo et al.

(12) 
(10) Patent No.: US 6,472,046 B1
(45) Date of Patent: Oct. 29, 2002

(54) BIAXIALLY ORIENTED POLYESTER FILM TO BE LAMINATED ONTO METAL PLATE AND MOLDED

(75) Inventors: Koji Kubo, Sagamihara (JP); Hirofumi Murooka, Sagamihara (JP); Masahiko Kosuge, Matsuyama (JP); Hideshi Kurihara, Matsuyama (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/367,593

(22) PCT Filed: Dec. 15, 1998

(86) PCT No.: PCT/JP98/05660
§ 371 (c)(1),
(2), (4) Date: Aug. 18, 1999

(87) PCT Pub. No.: WO99/31168
PCT Pub. Date: Jun. 24, 1999

(30) Foreign Application Priority Data

Dec. 18, 1997 (JP) .............................. 9-349144
Dec. 19, 1997 (JP) .............................. 9-351055
Mar. 11, 1998 (JP) .............................. 10-059652

(51) Int. Cl.[7] .............................. B32B 5/16; B32B 5/18; B32B 15/08; B32B 27/36; B32B 31/20
(52) U.S. Cl. .............................. 428/141; 428/220; 428/316.6; 428/323; 428/331; 428/458; 428/480; 428/910; 156/224; 156/218; 156/217; 156/221
(58) Field of Search .............................. 428/141, 220, 428/323, 331, 316.6, 317.9, 458, 480, 910; 156/224, 218, 217, 221

(56) References Cited

U.S. PATENT DOCUMENTS 5,879,854 A * 3/1999 Tomita et al. ............ 430/272.1
6,086,989 A * 7/2000 Kubo et al. .................. 428/335

FOREIGN PATENT DOCUMENTS

| EP | 0 474 240 A2 | 3/1992 |
|---|---|---|
| EP | 0 839 854 A1 | 5/1998 |
| JP | A 6-116376 | 4/1994 |
| JP | A 8-269215 | 10/1996 |
| JP | A 9-278996 | 10/1997 |
| JP | A 302113 | 11/1997 |

* cited by examiner

Primary Examiner—Paul Thibodeau
Assistant Examiner—Ramsey Zacharia
(74) Attorney, Agent, or Firm—Sughrue Mion, PLLC

(57) ABSTRACT

A biaxially oriented polyester film to be laminated onto a metal plate and molded, (A) which comprises a copolyester comprising (a) terephthalic acid in an amount of 82 to 100 mol % and 2,6-naphthalenedicarboxylic acid or a combination of 2,6-naphthalenedicarboxylic acid and other dicarboxylic acid in an amount of 0 to 18 mol % of the total of all dicarboxylic acid components and (b) ethylene glycol in an amount of 82 to 100 mol % and cyclohexanedimethanol or a combination of cyclohexanedimethanol and other diol in an amount of 0 to 18 mol % of the total of all diol components, having (c) a glass transition temperature of 78° C. or more and (d) a melting point of 210 to 250° C., and containing (e) porous silica particles with a pore volume of 0.5 to 2.0 ml/g which are agglomerates of primary particles having an average particle diameter of 0.001 to 0.1 $\mu$m; and (B) which has the following relationship between the highest peak temperature (Te, °C.) of loss elastic modulus and the glass transition temperature (Tg, °C.): Te−Tg≦30. This film has improved taste-and-flavor retainabilities, particularly taste and flavor retainabilities after a retort treatment, without losing the excellent moldability, heat resistance, impact resistance and retort resistance of a copolyester film.

20 Claims, No Drawings

BIAXIALLY ORIENTED POLYESTER FILM TO BE LAMINATED ONTO METAL PLATE AND MOLDED

TECHNICAL FIELD

The present invention relates to a polyester film to belaminated onto a metal plate-and molded. More specifically, it relates to a polyester to be laminated onto a metal plate and molded, which exhibits excellent moldability when laminated onto a metal plate to be subjected to a can making process such as drawing and which can be used to produce metal cans having excellent heat resistance, retort resistance, taste-and-flavor retainabilities and impact resistance, such as drink cans and food cans.

BACKGROUND ART

Metal cans are generally coated on interior and exterior surfaces to prevent corrosion. Recently, the development of methods for obtaining corrosion resistance without using an organic solvent has been promoted for the purpose of simplifying production process, improving sanitation and preventing pollution. One of the methods is to coat a metal can with a thermoplastic resin film.

That is, studies on a method for making cans, which comprises laminating a thermoplastic resin film on a plate of a metal such as tin, tin-free steel or aluminum and drawing the laminated metal plate, are under way.

It gradually becomes clear that a copolyester film is suitable for use as this thermoplastic resin film in terms of moldability, heat resistance, impact resistance and taste-and-flavor retainabilities. This polyester film, however, does not always exhibit sufficient taste-and-flavor retainabilities when a can coated therewith contains a drink whose delicate taste is important, such as green tea, or mineral water which must be tasteless and odorless, and changes in flavor and taste of the contents are detected.

JP-A 6-116376 proposes a polyester film to be laminated onto a metal plate and molded, which is made from a copolyester containing alkali-metal elements and a germanium element in specific amounts and which has improved flavor retainabilities When this film is used to coat a can, however, it exhibits excellent taste-and-flavor retainabilities as in a cold pack system in which heat is not applied to the can with contents, whereas it does not always obtain sufficient taste-and-flavor retainabilities as in a retort treatment in which heat is applied to the can with contents.

DISCLOSURE OF THE INVENTION

It is an object of the present invention to provide a polyester film to be laminated onto a metal plate and molded, which solves the above problems of the prior art and which has improved taste-and-flavor retainabilities, particularly taste-and-flavor retainabilities after a retort treatment without losing excellent moldability, heat resistance, impact resistance and retort resistance of a copolyester film.

The other objects and advantages of the present invention will become apparent from the following description.

According to the present invention, the above objects and advantages of the present invention are attained by a biaxially oriented polyester film to be laminated onto a metal plate and molded, (A) which comprises a copolyester comprising (a) terephthalic acid in an amount of 82 to 100 mol % and 2,6-naphthalenedicarboxylic acid or a combination of 2,6-naphthalenedicarboxylic acid and other dicarboxylic acid in an amount of 0 to 18 mol % of the total of all dicarboxylic acid components and (b) ethylene glycol in an amount of 82 to 100 mol % and cyclohexanedimethanol or a combination of cyclohexanedimethanol and other diol in an amount of 0 to 18 mol % of the total of all diol components, having (c) a glass transition temperature of 78° C. or more and (d) a melting point of 210 to 250° C., and containing (e) porous silica particles with a pore volume of 0.5 to 2.0 ml/g which are agglomerates of primary particles having an average particle diameter of 0.001 to 0.1 μm; and (B) which has the following relationship between the highest peak temperature (Te, °C.) of loss elastic modulus and the glass transition temperature (Tg, °C.):

$Te-Tg \leq 30$.

DETAILED DESCRIPTION OF THE INVENTION

The copolyester in the present invention comprises terephthalic acid in an amount of 82 to 100 mol % and 2,6-naphthalenedicarboxylic acid or a combination of 2,6-naphthalenedicarboxylic acid and other dicarboxylic acid in an amount of 0 to 18 mol % of the total of all dicarboxylic acid components.

Illustrative examples of the other dicarboxylic acid include aromatic dicarboxylic acids such as isophthalic acid and phthalic acid; aliphatic dicarboxylic acids such as adipic acid, azelaic acid, sebacic acid and decanedicarboxylic acid; and alicyclic dicarboxylic acids such as cyclohexanedicarboxylic acid. They may be used alone or in combination of two or more.

The copolyester in the present invention comprises ethylene glycol in an amount of 82 to 100 mol % and cyclohexanedimethanol or a combination of cyclohexanedimethanol and other diol in an amount of 0 to 18 mol % of the total of all diol components.

Illustrative examples of the other diol include aliphatic diols such as diethylene glycol, propylene glycol, neopentyl glycol, butanediol, pentanediol and hexanediol; alicyclic diols such as cyclohexanedimethanol; aromatic diols such as bisphenol A; and polyalkylene glycols such as polyethylene glycol and polypropylene glycol. They may be used alone or in combination of two or more.

The above copolyester may comprise at least one or both of 2,6-naphthalenedicarboxylic acid and 1,4-cyclohexanedimethanol as a copolymer component.

It is particularly preferable that all the dicarboxylic acid components of the copolyester consist of terephthalic acid and 2,6-naphthalenedicarboxylic acid and that all the diol components of the copolyester consist of ethylene glycol.

The copolyester in the present invention has a glass transition temperature (Tg) of 78° C. or more and a melting point of 210 to 250° C.

If Tg is lower than 78° C., heat resistance will deteriorate and taste-and-flavor retainabilities after a retort treatment will degrade when the film of the present invention is laminated onto a metal plate and molded into a metal can. To increase the Tg of the copolyester of the present invention to 78° C. or higher, 2,6-naphthalenedicarboxylic acid and cyclohexanedimethanol are used as copolymer components.

The glass transition temperature (Tg) of the copolyester is preferably in the range of 78 to 90° C.

To obtain a Tg of polyester, a 20-mg film sample is placed in a DSC measurement pan, molten by heating on a stage at 290° C. for 5 minutes and solidified by quenching the pan on an aluminum foil laid on ice to obtain a glass transition point at a temperature elevation rate of 20° C./min using the 910 DSC of Du Pont Instruments.

When the melting point is lower than 210° C., the heat resistance of the polymer deteriorates. On the other hand, when the melting point is higher than 250° C., the crystallinity of the polymer becomes too high with the result of impaired moldability.

The melting point of the copolyester is preferably in the range of 210 to 245° C.

The melting point of copolyethylene terephthalate is measured in accordance with a method for obtaining a melting peak at a temperature elevation rate of 20° C./min using the 910 DSC of Du Pont Instruments. The quantity of a sample is 20 mg.

The intrinsic viscosity (orthochlorophenol, 35° C.) of the copolyester is preferably in the range of 0.52 to 1.50, more preferably 0.57 to 1.00, particularly preferably 0.60 to 0.80. When the intrinsic viscosity is lower than 0.52, impact resistance may be insufficient disadvantageously. On the other hand, when the intrinsic viscosity is higher than 1.50, moldability may be impaired.

The content of acetaldehyde in the copolyester is preferably 15 ppm or less, more preferably 12 ppm or less, much more preferably 10 ppm or less.

When the content of the acetaldehyde is larger than 15 ppm, the taste-and-flavor retainabilities of the contents tend to lower disadvantageously.

The concentration of the terminal carboxyl groups of the copolyester is preferably 40 equivalents/$10^6$ g or less, more preferably 35 equivalents/$10^6$ g or less, much more preferably 30 equivalents/$10^6$ g.

When the concentration of the terminal carboxyl groups is higher than 40 equivalents/$10^6$ g, the amount of the acetaldehyde contained in the film tends to increase as well and the taste-and-flavor retainabilities of the contents are apt to lower. Heat resistance and retort resistance are also liable to lower and excellent properties obtained by the present invention are canceled disadvantageously.

The electric resistivity at 290° C. of the molten copolyester is preferably set to $5 \times 10^6$ to $1 \times 10^9$ Ω·cm to achieve not only excellent flatness by employing an electrostatic impression process when the film of the present invention is produced but also excellent lamination property and moldability when the film is laminated onto a metal plate and molded into a metal can. When the electric resistivity is lower than $5 \times 10^6$ Ω·cm, the taste-and-flavor retainabilities after can making deteriorate disadvantageously. On the other hand, when the electric resistivity is higher than $1 \times 10^9$ Ω·cm, film productivity lowers and lamination property and moldability deteriorate disadvantageously.

Although the copolyester in the present invention is not limited by a production process thereof, preferred processes for producing a desired copolyester are one which comprises subjecting terephthalic acid, ethylene glycol and a copolymer component to an esterification reaction and polycondensing the reaction product until a target degree of polymerization is achieved, and one which comprises subjecting dimethyl terephthalate, ethylene glycol and a copolymer component to an ester interchange reaction and polycondensing the reaction product until. a target degree of polymerization is achieved. The copolyester obtained by one of the above processes (melt polymerization) can be changed into a polymer having a higher degree of polymerization by polymerization in asolid phase (solid-phase polymerization) as required.

The copolyester may contain such additives as an antioxidant, heat stabilizer, viscosity modifier, plasticizer, color modifier, lubricant, nucleating agent and ultraviolet absorber as required.

Preferred examples of the catalyst used for the above polycondensation reaction include antimony compounds (Sb compounds), titanium compounds (Ti compounds) and germanium compounds (Ge compounds). Of these, titanium compounds and germanium compounds are more preferred from the viewpoint of the flavor retainabilities of a film. Preferred titanium compounds include titanium tetrabutoxide and titanium acetate. Preferred germanium compounds include (a) amorphous germanium oxide, (b) fine crystalline germanium oxide, (c) a solution of germanium oxide dissolved in glycol in the presence of an alkali metal, alkaline earth metal or compound of these and (d) a solution of germanium oxide dissolved in water. When an antimony compound and a titanium compound are used in combination, taste-and-flavor retainabilities can be improved and costs can be reduced advantageously.

The copolyester must contain porous silica particles which are agglomerated particles. When only globular or amorphous silica particles are contained as in the prior art, a remarkable effect of improving taste-and-flavor retainabilities cannot be obtained.

The average particle diameter of primary particles forming the porous silica particles must be in the range of 0.001 to 0.1 μm. When the average particle diameter of the primary particles is smaller than 0.001 μm, very fine particles are produced by cracking in the stage of a slurry and form agglomerates, causing the formation of pin holes with the result of deterioration in moldability. On the other hand, when the average particle diameter of the primary particles is larger than 0.1 μm, the porosity of the particles is lost with the result that taste-and-flavor retainabilities are not improved.

Further, the pore volume of the porous silica particles must be in the range of 0.5 to 2.0 ml/g, preferably 0.6 to 1.8 ml/g. When the pore volume is smaller than 0.5 ml/g, the porosity of the particles is lost with the result that taste-and-flavor retainabilities are not improved. On the other hand, when the pore volume is larger than 2.0 ml/g, agglomeration readily occurs by cracking, causing the formation of pin holes with the result of deterioration in moldability.

The particle diameter and amount of the porous silica particles may be determined according to film winding property, pin hole resistance and taste-and-flavor retainabilities. The average particle diameter of the porous silica particles is generally in the range of 0.1 to 5 μm, preferably 0.3 to 3 μm, and the amount thereof is generally in the range of 0.01 to 1 wt %, preferably 0.02 to 0.5 wt %.

Although the porous silica particles used in the present invention are agglomerated, the polyester film of the present invention preferably contains coarse agglomerated particles whose size is 50 μm or more at a density of 10/m² or less, more preferably 5/m² or less, much more preferably 3/m² or less. When the number of coarse agglomerated particles whose size is 50 μm or more is too large, pin holes are readily formed and moldability is apt to deteriorate.

To reduce the number of coarse agglomerated particles, it is preferable to filter a molten polymer using a non-woven filter, which is formed of a thin stainless steel wire having a diameter of 15 μm or less and which has an average mesh size of 10 to 30 μm, preferably 15 to 25 μm, as a filter for the production of a film. The porous silica particles are generally added to a reaction system, preferably as a slurry contained in a glycol, at the time of a reaction for producing a polyester, for example, at any time during an ester interchange reaction or a polycondensation reaction when an ester interchange method is employed or at any time when a direct polymerization method is employed. It is particularly preferable that the porous silica particles be added to the reaction system in the initial stage of the polycondensation reaction, for example, before the intrinsic viscosity reaches about 0.3.

A lubricant is preferably added to the copolyester for the purpose of improving film winding property. The lubricant may be inorganic or organic but preferably inorganic. Illustrative examples of the inorganic lubricant include silica, alumina, titanium oxide, calcium carbonate and barium sulfate, and illustrative examples of the organic lubricant include silicone resin particles and crosslinked polystyrene particles. The lubricant is preferably monodisperse inert spherical particles, which have a particle diameter ratio (long diameter/short diameter) of 1.0 to 1.2 and which are not substantially agglomerated, particularly from the viewpoint of pin hole resistance. Illustrative examples of such a lubricant include completely spherical silica, completely spherical silicone resin particles, and spherical crosslinked polystyrene.

The average particle diameter of the inert spherical particles is preferably 2.5 $\mu$m or less, more preferably 0.05 to 1.5 $\mu$m.

In the present invention, the average particle diameter of the inert spherical particles is particularly preferably smaller than the average particle diameter of the above porous silica particles and in the range of 0.05 to 0.8 $\mu$m.

The content of the inert spherical particles is preferably 0.01 to 1 wt %.

The lubricant is not limited to the above externally added particles and may be internally deposited particles obtained by depositing part or all of the catalyst used in the production of a polyester in a reaction step, for example. It is also possible to use the externally added particles and the internally deposited particles in combination.

Two different kinds of particles having different average particle diameters may be used in combination as the lubricant or the inert spherical particles.

The biaxially oriented polyester film of the present invention is made from the above copolyester having the following relationship between the highest peak temperature (Te, °C.) of loss elastic modulus and the glass transition temperature (Tg, °C.).

$$Te-Tg \leq 30$$

When the value of Te−Tg is larger than 30, the molecule orientation and crystallinity of the film become too high, with the result of great deterioration in moldability. The value of Te, which depends on the type and amount of the copolymer component, is preferably adjusted particularly by the stretch ratios of biaxial stretching, stretching temperature and heat-setting temperature according to film formation conditions.

Te is obtained at a measurement frequency of 10 Hz and a dynamic displacement of $\pm 25 \times 10^{-4}$ cm using a dynamic visco-elastometer.

The relationship between the highest peak temperature (Te) of loss elastic modulus and the glass transition temperature (Tg) is preferably $$15 \leq Te-Tg \leq 25.$$

The refractive index in a thickness direction of the polyester film of the present invention is preferably 1.500 to 1.545, more preferably 1.505 to 1.530. When this refractive index is too low, moldability becomes unsatisfactory. On the other hand, when the refractive index is too high, the structure of the polyester film becomes almost amorphous, whereby heat resistance may lower.

The refractive index in a thickness direction of the polyester film is measured by a monochromatic NaD ray with a polarizing plate analyzer attached to the eyepiece side of an Abbe's refractometer. The mount solution is methylene iodide and the measurement temperature is 25° C.

The center line average roughness (Ra) of the polyester film surface of the present invention is preferably 35 nm or less from the viewpoints of film winding property and taste-and-flavor retainabilities. Ra is more preferably 15 nm or less, particularly preferably 4 to 15 nm.

The center line average roughness (Ra) of the film surface is measured in accordance with JIS-B0601 and defined as a value (Ra: nm) obtained from the following expression when a portion having measurement length L is extracted from a film surface roughness curve in its center line direction, the center line of the extracted portion is taken as an X axis and the direction of the longitudinal stretch ratio is taken as an Y axis to represent a roughness curve Y=f(x).

$$Ra=1/L \int_0^L |f(x)| dx$$

In the present invention, five portions having a reference length of 2.5 mm are measured and the mean of four measurement values excluding the largest value is taken as Ra.

Since the polyester film of the present invention is used especially in food cans and drink cans, it is preferable that the amount of a substance dissolved out or dispersed from the film be as small as possible. However, it is substantially impossible to eliminate the substance. Therefore, to use the polyester film of the present invention in food or drink cans, the amount of the film extracted with ion exchange water at 121° C. for 2 hours is preferably 0.5 mg/cm$^2$ or less (0.0775 mg/cm$^2$ or less), more preferably 0.1 mg/cm$^2$ or less (0.0155 mg/cm$^2$ or less).

To reduce the amount of the extracted film, it is recommended to increase Tg of the copolyester.

The polyester film of the present invention preferably has a thickness of 6 to 75 $\mu$m, more preferably 8 to 75 $\mu$m, particularly preferably 10 to 50 $\mu$m. When the thickness is smaller than 6 $\mu$m, the polyester film is easily broken at the time of processing. On the other hand, when the thickness is larger than 75 $\mu$m, the polyester film has excessive quality, which is uneconomical.

The metal plate to be laminated with the polyester film of the present invention, particularly a metal plate for can making is advantageously a plate of tin, tin-free steel, aluminum or the like. The polyester film can be laminated on the metal plate by the following methods (1) and (2), for example.

(1) The metal plate is heated to a temperature higher than the melting point of the film, laminated with the film and quenched. This makes the surface layer portion (thin layer portion) of the film, which is in contact with the metal plate, amorphous, whereby the film is bonded to the metal plate.

(2) A primer is coated on the film to form an adhesive layer and the film is laminated on the metal plate in such a manner that the adhesive layer comes into contact with the metal plate. Known resin adhesives such as epoxy adhesives, epoxy-ester adhesives and alkyd adhesives can be used to form the adhesive layer.

The following examples are given to further illustrate the present invention. Characteristic properties in the examples were measured in accordance with the following methods.

(1) Intrinsic Viscosity of Polyester

This is measured in orthochlorophenol at 35° C.

(2) Melting Point of Polyester

This is determined by obtaining a melting peak at a temperature elevation rate of 20° C./min using the 910 DSC of Du Pont Instruments. The amount of a sample is 20 mg.

(3) Amount of Acetaldehyde (ppm)

The amount of acetaldehyde formed when the film is heated at 160° C. for 20 minutes is determined by gas chromatography.

(4) Concentration of Terminal Carboxyl Groups (Equivalent/$10^6$ g)

This is measured in accordance with an A. Conix method (Makromal. Chem. 26, 226 (1958))

(5) Electric Resistivity of Molten Polymer ($\Omega \cdot cm$)

This is measured in accordance with a method specified in British. J. Appl. Phys. (17, 1149–1154(1966)). The sample is molten at 290° C. and applied with a DC of 1,000 V, and a stabilized measurement value is taken as an electric resistivity of a molten polymer.

(6) Glass Transition Temperature (Tg) of Polyester

A 20-mg film sample is placed in a DSC measurement pan, molten by heating on a stage at 290° C. for 5 minutes and solidified by quenching the pan on an aluminum foil laid on ice. The glass-transition temperature of polyester is determined by obtaining a glass transition point at a temperature elevation rate of 20° C./min using the 910 DSC of Du Pont Instruments.

(7) Highest Peak Temperature (Te) of Loss Elastic Modulus of Film

The loss elastic modulus is obtained at a dynamic displacement of $\pm 25 \times 10^{-4}$ cm and a measurement frequency of 10 Hz using a dynamic visco-elastometer and the highest peak temperature at this point is taken.

(8) Particle Diameter of Particles

Silica particles are scattered in such a manner that each of the particles is not overlapped with another particle, a metal is deposited on the surface by a gold sputtering device to form a film having a thickness of 20 to 30 nm, the film is observed through a scanning electron microscope at a magnification of 10,000 to 30,000×, and the obtained image is processed with the Luzex 500 of Nippon Regulator Co., Ltd. The average particle diameter of primary particles is obtained from the average particle diameter of 100 particles from the processed image.

The median diameter in equivalent sphere diameter distribution measured by a centrifugal particle size analyzer is taken as the average particle diameter of particles which are agglomerates of primary particles and separate particles.

The particle diameter of each particle contained in the film is measured by the following method.

A small piece of a sample film is set on the sample table of a scanning electron microscope, and the surface of the film is ion-etched using the sputtering device (JFC-1100 ion etching device) of JEOL Ltd. under the following conditions. The conditions are such that the sample is set in a bell jar, the degree of vacuum is raised to about 3 to 10 Torr and ion etching is carried out at a voltage of 0.25 kV and a current of 12.5 mA for about 10 minutes. Further, the surface of the film is subjected to gold sputtering with the same device and the area equivalent diameters of at least 100 particles are obtained with the Luzex 500 of Nippon Regulator Co., Ltd. The mean of measurement values is taken as an average particle diameter.

(9) Pore Volume

Using the AUTOSORB-1 of Quantachrome Co., Ltd., the pore volume of powder is obtained by measuring the amount of nitrogen absorbed at a relative pressure of 0.998 in accordance with a static volumetric method on the assumption that the pores of the powder are filled with nitrogen.

The pore volume of the particles contained in the film is measured in accordance with the following method.

An appropriate amount of a film containing a lubricant is sampled, and a solution of chloroform and HFIP (hexafluoroisopropanol) mixed in a ratio of 1:1 is added to the sample in an excessive amount. The sample is left to stand in the solution for a whole day to dissolve the sample completely. The particles are separated by centrifugation or filtration, a polymer component remaining in the lubricant particles is removed by the above mixed solution, and the particles are diluted with and dispersed in ethanol and filtered with a straight-hole membrane filter (whose mesh is selected according to the particle diameter of the lubricant). After the end of filtration, the surface of the filter is washed with ethanol and the ethanol solution is filtered. After filtration, the filter is dried to take out particles. This procedure was repeated, and the pore volume of the collected particles is obtained by measuring the amount of nitrogen absorbed at a relative pressure of 0.998 in accordance with a static volumetric method using the AUTOSORB-1 of Quantachrome Co., Ltd. on the assumption that the pores of the particles are filled with nitrogen.

(10) Center Line Average Roughness (Ra)

This is measured using the tracer-type surface roughness meter (SURFCORDER SE-30C) of Kosaka Laboratory Co., Ltd. under the following conditions.

tracer radius: 2 $\mu$m measurement pressure: 0.03 g cut-off value: 0.25 mm

(11) Deep Drawability

A film is laminated on both sides of a 0.25-mm-thick tin-free steel plate heated to a temperature higher than the melting point of a polyester, cooled with water and cut into a 150-mm-diameter disk-like piece. The disk-like piece is deep drawn using a drawing dice and a punch in four stages to form a 55-mm-diameter container having seamless side (to be called "can" hereinafter). This can is observed and tested for the following items and evaluated based on the following criteria.

(a) Deep Drawability-1

○: The film is processed without an abnormality and neither whitened nor broken.

Δ: The film at the top portion of the can is whitened.

X: Part of the film is broken.

(b) Deep Drawability-2

○: The film is processed without an abnormality and exhibits a current value of 0.2 mA or less in an anti-corrosion test on the film on the interior surface of the can. (The current value is measured when electrodes are inserted into the can charged with a 1% NaCl aqueous solution and a voltage of 6V is applied with the can body functioning as an anode. This test is called "ERV test" hereinafter.)

X: The film is not abnormal but exhibits a current value of 0.2 mA or more in the ERV test. When an energized portion of the film is magnified and observed, a pin-hole-like crack, which is started from the coarse lubricant of the film, is observed.

(12) Impact Resistance

Well deep drawn cans are filled with water and cooled to 0° C., and 1.0 of the cans are dropped onto a vinyl-chloride-tiled floor from a height of 30 cm for each test. Thereafter, an ERV test is made on the inside of each can.

○: The films of all the 10 cans exhibit a current value of 0.2 mA or less.

Δ: The films of 1 to 5 cans exhibit a current value of more than 0.2 mA.

X: The films of at least 6 cans exhibit a current value of more than 0.2 mA, or the film is cracked after dropped.

(13) Resistance to Heat Embrittlement

Well deep drawn cans are heated at 200° C. for 5 minutes and evaluated for impact resistance as described in (8).

○: The films of all the 10 cans exhibit a current value of 0.2 mA or less.

Δ: The films of 1 to 5 cans exhibit a current value of more than 0.2 mA.

X: The films of at least 6 cans exhibit a current value of more than 0.2 mA, or the film is cracked after heated at 200° C. for 5 minutes.

(14) Retort Resistance

Well deep drawn cans are filled with water, subjected to a retort treatment at 120° C. for 1 hour using a steam sterilizer, and kept at 50° C. for 30 days. Ten of the cans are dropped onto a vinyl-chloride-tiled floor from a height of 50 cm for each test. Thereafter, an ERV test is made on the inside of each can.

○: The films of all the 10 cans exhibit a current value of 0.2 mA or less.

Δ: The films of 1 to 5 cans exhibit a current value of more than 0.2 mA.

X: The films of at least 6 cans exhibit a current value of more than 0.2 mA, or the film is cracked after dropped.

(15) Taste-and-flavor Retainabilities-1

Well deep drawn cans are filled with ion exchange water and kept at normal temperature (20° C.) for 30 days. A drink test is made by 30 panelists using the immersion liquid to be compared with ion exchange water as reference. The taste-and-flavor retainabilities of the film are evaluated based on the following criteria.

◎: Three or less out of 30 panelists feel changes in taste and flavor in comparison with the reference liquid.

○: Four to 6 out of 30 panelists feel changes in taste and flavor in comparison with the reference liquid.

Δ: Seven to 9 out of 30 panelists feel changes in taste and flavor in comparison with the reference liquid.

X: Ten or more out of 30 panelists feel changes in taste and flavor in comparison with the reference liquid.

(16) Taste-and-flavor Retainabilities-2

Well deep drawn cans are filled with ion exchange water, subjected to a retort treatment in a steam sterilizer at 120° C. for 1 hour and kept at normal temperature (20° C.) for 30 days. A drink test is made by 30 panelists using the immersion liquid to be compared with ion exchange water as reference. The taste-and-flavor retainabilities of the film are evaluated based on the following criteria.

◎: Three or less out of 30 panelists feel changes in taste and flavor in comparison with the reference liquid.

○: Four to 6 out of 30 panelists feel changes in taste and flavor in comparison with the reference liquid.

Δ: Seven to 9 out of 30 panelists feel changes in taste and flavor in comparison with the reference liquid.

X: Ten or more out of 30 panelists feel changes in taste and flavor in comparison with the reference liquid.

EXAMPLES 1 TO 5 and

Comparative Examples 1 and 2

Copolyethylene terephthalates (having an intrinsic viscosity of 0.64 and containing 0.1 wt % of porous silica particles which are agglomerates of primary particles having an average particle diameter of 0.05 μm and which have a pore volume of 1.3 ml/g and an average particle diameter of 0.6 μm) prepared by copolymerizing the components shown in Table 1 were dried, melt-extruded and quenched to be solidified so as to obtain unstretched films. The unstretched films were stretched in a longitudinal direction at the stretch ratios and temperatures shown in Table 1 and then in a transverse direction at the stretch ratios and temperatures shown in Table 1, and further heat-set at 180° C. to obtain biaxially oriented polyester films.

Each of the obtained films had a thickness of 25 μm and a center line average roughness (Ra) of 0.010 μm and contained no coarse agglomerated particles, which are 50 μm or more in size, per $m^2$. The glass transition temperatures (Tg), the highest peak temperatures of loss elastic moduli (Te), the refractive indices in a film thickness direction and the quantities of extracts with ion exchange water of the films are shown in Table 2 and the evaluation results are shown in Table 3.

TABLE 1

| | copolymer component | copolymerization ratio mol % | melting point ° C. | longitudinal stretching | | transverse stretching | |
|---|---|---|---|---|---|---|---|
| | | | | stretch ratio | temperature ° C. | stretch ratio | temperature ° C. |
| C. Ex. 1 | NDC | 20 | 208 | 3.6 | 115 | 3.7 | 115 |
| Ex. 1 | " | 18 | 213 | 3.5 | 110 | 3.5 | 115 |
| Ex. 2 | " | 12 | 228 | 3.2 | 110 | 3.4 | 120 |
| Ex. 3 | " | 6 | 242 | 2.9 | 125 | 3.1 | 135 |
| C. Ex. 2 | " | 2 | 252 | 2.7 | 125 | 2.7 | 130 |
| Ex. 4 | CHDM | 12 | 229 | 3.0 | 110 | 3.2 | 125 |
| Ex. 5 | IA | 6 | 228 | 3.0 | 115 | 3.2 | 130 |
| | NDC | 6 | | | | | |

Ex.: Example,
C. Ex.: Comparative Example
Notes)
copolymer component
NDC . . . 2,6-naphthalenedicarboxylic acid
CHDM . . . 1,4-cyclohexanedimethanol
IA . . . isophthalic acid

TABLE 2

| | Tg °C. | Te °C. | COOH eq/10⁶ g | CH₃CHO ppm | electric resistivity of molten polymer Ω · cm | refractive index in thickness direction | Ra (μm) | quantity of extract with ion exchange water mg/inch² |
|---|---|---|---|---|---|---|---|---|
| C. Ex. 1 | 84 | 100 | 30 | 8 | 1.0 × 10⁸ | 1.543 | 0.010 | 0.21 |
| Ex. 1 | 83 | 103 | 30 | 8 | 1.0 × 10⁸ | 1.541 | 0.010 | 0.16 |
| Ex. 2 | 81 | 107 | 33 | 10 | 1.0 × 10⁸ | 1.518 | 0.010 | 0.08 |
| Ex. 3 | 80 | 107 | 33 | 10 | 1.0 × 10⁸ | 1.514 | 0.010 | 0.07 |
| C. Ex. 2 | 78 | 106 | 35 | 12 | 1.0 × 10⁸ | 1.511 | 0.010 | 0.07 |
| Ex. 4 | 79 | 102 | 33 | 10 | 1.0 × 10⁸ | 1.520 | 0.010 | 0.19 |
| Ex. 5 | 78 | 98 | 33 | 10 | 1.0 × 10⁸ | 1.522 | 0.010 | 0.21 |

Notes)
COOH content of carboxyl groups
CH₃CHO content of aldehyde

TABLE 3

| | deep drawability 1 | deep drawability 2 | impact resistance | resistance to heat embrittleness | retort resistance | taste and flavor retainabilities 1 | taste and flavor retainabilities 2 | overall evaluation |
|---|---|---|---|---|---|---|---|---|
| C. Ex. 1 | ○ | ○ | ○ | ○ | ○ | ⊙ | Δ | Δ |
| Ex. 1 | ○ | ○ | ○ | ○ | ○ | ⊙ | ⊙ | ⊙ |
| Ex. 2 | ○ | ○ | ○ | ○ | ○ | ⊙ | ⊙ | ⊙ |
| Ex. 3 | ○ | ○ | ○ | ○ | ○ | ⊙ | ⊙ | ⊙ |
| C. Ex. 2 | Δ | X | — | — | — | ⊙ | — | X |
| Ex. 4 | ○ | ○ | ○ | ○ | ○ | ⊙ | ○ | ⊙ |
| Ex. 5 | ○ | ○ | ○ | ○ | ○ | ○ | ○ | ○ |

The mark "—" in the table indicates that evaluation was not made.

As is evident from Table 3, in the case of the present invention (Examples 1 to 5) in which the melting points of copolyesters were 210 to 245° C., good results were obtained. When the melting point was lower than 210° C. (Comparative Example 1), the obtained film had poor heat resistance and low taste-and-flavor retainabilities after a retort treatment, while when the melting point was higher than 250° C. (Comparative Example 2), the film was unsatisfactory in terms of moldability.

EXAMPLES 6 AND 7 and

Comparative Examples 3 and 4

Copolyethylene terephthalates (having an intrinsic viscosity of 0.62 and containing 0.1 wt % of porous silica particles which are agglomerates of primary particles having an average particle diameter of 0.03 μm and which have a pore volume of 1.0 ml/g and an average particle diameter of 0.8 μm) prepared by copolymerizing the components shown in Table 4 were dried, extruded, and quenched to be solidified so as to obtain unstretched films. The unstretched films were stretched and heat-set under the conditions shown in Table 4 to obtain biaxially oriented polyester films.

Each of the obtained films had a thickness of 25 μm and a center line average roughness (Ra) of 0.012 μm and contained one coarse agglomerated particle, which is 50 μm or more in size, per m². The glass transition temperatures (Tg), the highest peak temperatures of loss elastic moduli (Te), the refractive indices in a film thickness direction and the quantities of extracts with ion exchange water of the films are shown in Table 5.

The evaluation results are shown in Table 6. When Tg was 780 C or more and Te–Tg was 30° C. or less in the present invention (Examples 6 and 7), good results were obtained. When Tg was lower than 78° C. (Comparative Example 3), the film had poor heat resistance and low taste-and-flavor retainabilities after a retort treatment. When Te–Tg was higher than 30° C. (Comparative example 4), the film had low moldability.

TABLE 4

| | copolymer component | copolymerization ratio mol % | melting point °C. | longitudinal stretching stretch ratio | longitudinal stretching temperature °C. | transverse stretching stretch ratio | transverse stretching temperature °C. | Heat setting temperature °C. |
|---|---|---|---|---|---|---|---|---|
| C. Ex. 3 | IA | 6 | 235 | 3.1 | 115 | 3.2 | 125 | 170 |
| | NDC | 3 | | | | | | |
| Ex. 6 | IA | 3 | 235 | 3.1 | 115 | 3.2 | 125 | 170 |
| | NDC | 6 | | | | | | |
| Ex. 7 | NDC | 9 | 235 | 3.1 | 115 | 3.2 | 125 | 170 |
| C. Ex. 4 | NDC | 9 | 235 | 3.2 | 115 | 3.3 | 125 | 170 |

Notes)
copolymer component
IA . . . isophthalic acid
NDC . . . 2,6-naphthalenedicarboxylic acid

TABLE 5

|  | Tg °C. | Te °C. | Te-Tg °C. | refractive index in thickness direction | quantity of extract with ion exchange water mg/inch² |
|---|---|---|---|---|---|
| C.Ex.3 | 77 | 102 | 25 | 1.513 | 0.19 |
| Ex.6 | 79 | 105 | 26 | 1.511 | 0.11 |
| Ex.7 | 81 | 109 | 28 | 1.516 | 0.08 |
| C.Ex.4 | 81 | 113 | 32 | 1.512 | 0.04 |

TABLE 6

|  | deep drawability 1 | deep drawability 2 | impact resistance | resistance to heat embrittleness | retort resistance | taste-and-flavor retainabilities 1 | taste-and-flavor retainabilities 2 | overall evaluation |
|---|---|---|---|---|---|---|---|---|
| C. Ex. 3 | ○ | ○ | ○ | ○ | ○ | ⊙ | △ | △ |
| Ex. 6 | ○ | ○ | ○ | ○ | ○ | ⊙ | ⊙ | ⊙ |
| Ex. 7 | ○ | ○ | ○ | ○ | ○ | ⊙ | ⊙ | ⊙ |
| C. Ex. 4 | ○ | X | — | — | — | — | — | X |

The mark "—" in the table indicates that evaluation was not made.

EXAMPLES 8 TO 11 and

Comparative Examples 5 to 8

The average particle diameter and pore volume of the primary particles of porous silica were changed as shown in Table 7 in Example 2 to obtain biaxially oriented polyester films.

The results are shown in Table 8. When the average particle diameter of the primary particles of porous silica was 0.01 to 0.1 μm and the pore volume thereof was 0.5 to 2.0 ml/g in the present invention (Examples 8 to 11), good results were obtained. When the average particle diameter of the primary particles was larger than 0.1 μm (Comparative Example 6) and the pore volume was smaller than 0.5 ml/g (Comparative Example 7), the porosity of silica lowered and the effect of improving taste-and-flavor retainabilities was small. When the average particle diameter of the primary particles was smaller than 0.001 μm (Comparative Example 5) and the pore volume was larger than 2.0 ml/g (Comparative Example 8), agglomeration easily occurred, pin holes were formed at the time of molding, and moldability was unsatisfactory.

TABLE 7

|  | Tg °C. | porous silica average particle diameter of primary particles μm | porous silica pore volume ml/g | refractive index in thickness direction | quantity of extract with ion exchange water mg/inch² |
|---|---|---|---|---|---|
| C.Ex.5 | 81 | 0.0008 | 1.5 | 1.518 | 0.08 |
| Ex.8 | 81 | 0.005 | 1.5 | 1.518 | 0.07 |
| Ex.9 | 81 | 0.09 | 1.5 | 1.518 | 0.09 |

TABLE 7-continued

|  | Tg °C. | porous silica average particle diameter of primary particles μm | porous silica pore volume ml/g | refractive index in thickness direction | quantity of extract with ion exchange water mg/inch² |
|---|---|---|---|---|---|
| C.Ex.6 | 81 | 0.11 | 1.5 | 1.518 | 0.10 |
| C.Ex.7 | 81 | 0.05 | 0.4 | 1.518 | 0.08 |
| Ex.10 | 81 | 0.05 | 0.6 | 1.518 | 0.10 |
| Ex.11 | 81 | 0.05 | 1.8 | 1.518 | 0.07 |
| C.Ex.8 | 81 | 0.05 | 2.1 | 1.518 | 0.10 |

TABLE 8

|  | deep drawability 1 | deep drawability 2 | impact resistance | resistance to heat embrittleness | retort resistance | taste-to-flavor retainabilities 1 | taste-to-flavor retainabilities 2 | overall evaluation |
|---|---|---|---|---|---|---|---|---|
| C. Ex. 5 | △ | X | — | — | — | — | — | X |
| Ex. 8 | ○ | ○ | ○ | ○ | ○ | ⊙ | ⊙ | ⊙ |
| Ex. 9 | ○ | ○ | ○ | ○ | ○ | ⊙ | ⊙ | ⊙ |
| C. Ex. 6 | ○ | ○ | ○ | ○ | ○ | ⊙ | △ | △ |
| C. Ex. 7 | ○ | ○ | ○ | ○ | ○ | ⊙ | △ | △ |
| Ex. 10 | ○ | ○ | ○ | ○ | ○ | ⊙ | ⊙ | ⊙ |
| Ex. 11 | ○ | ○ | ○ | ○ | ○ | ⊙ | ⊙ | ⊙ |
| C. Ex. 8 | △ | X | — | — | — | — | — | X |

The mark "—" in the table indicates that evaluation was not made.

EXAMPLES 12 TO 18

Copolyethylene terephthalates (containing 0.1 wt % of porous silica which is an agglomerate of primary particles having an average particle diameter of 0.03 μm and which have an average particle diameter of 0.8 μm and a pore volume of 1.0 ml/g)(may be abbreviated as co-PET hereinafter) were prepared using the acid components, diethylene glycol, alkali metal compounds, polycondensation catalysts and phosphorus compounds shown in Table 9. The copolyethylene terephthalates were dried, melt-extruded at 280° C., and quenched to be solidified so as to obtain unstretched films. The unstretched films were stretched to 3.0 times in a longitudinal direction at 110° C. and then to 3.0 times in a transverse direction at 120° C., and heat-set at 180° C. to obtain 25-μm-thick biaxially oriented films. The films had a center line average roughness (Ra) of 0.012 μm and other characteristic properties thereof are shown in Table 9 and Table 10.

TABLE 9

| | characteristic properties of polymer | | | |
|---|---|---|---|---|
| dicarboxylic acid components (molar ratio) | | DEG component (mol %) | poly-condensation catalyst | electric resistivity of molten polymer (Ω · cm) |
| A | B | | | |
| Ex.12 TA(90) | NDC(10) | 1.5 | $Sb_2O_3$ | $1.0 \times 10^8$ |
| Ex.13 TA(90) | NDC(10) | 1.0 | " | $1.0 \times 10^8$ |
| Ex.14 TA(90) | NDC(10) | 3.0 | " | $2.5 \times 10^8$ |
| Ex.15 TA(82) | NDC(18) | 1.5 | " | $1.0 \times 10^8$ |
| Ex.16 TA(94) | NDC(6) | " | " | $1.0 \times 10^8$ |
| Ex.17 TA(90) | NDC(10) | " | " | $1.5 \times 10^8$ |
| Ex.18 TA(90) | NDC(10) | " | $Sb(OCOCH_3)_3$ | $1.0 \times 10^8$ |

| | characteristic properties of polymer | | | |
|---|---|---|---|---|
| average particle diameter of lubricant (μm) | intrinsic viscosity | Tg (° C.) | melting point (° C.) | terminal carboxyl group (equivalents/$10^6$ g) |
| Ex.12 0.5 | 0.70 | 81 | 232 | 33 |
| Ex.13 " | " | 82 | 231 | 37 |
| Ex.14 " | " | 78 | 226 | 30 |
| Ex.15 " | " | 83 | 213 | 33 |
| Ex.16 " | " | 80 | 242 | 33 |
| Ex.17 " | " | 81 | 232 | 20 |
| Ex.18 " | " | 81 | 232 | 33 |

Notes) TA: terephthalic acid
NDA: 2,6-naphthalenedicarboxylic acid
DEG: diethylene glycol

EXAMPLES 19 TO 25

Copolyethylene terephthalates (intrinsic viscosity of 0.64), prepared by copolymerizing 10 mol % of 2,6-naphthalenedicarboxylic acid as a copolymer component and containing lubricants A having average particle diameters shown in Table 11 (porous silica which is an agglomerate of primary particles having an average particle diameter of 0.03 μm and which has a pore volume of 1.0 ml/g) and lubricants B having average particle diameters shown in Table 11 (completely spherical silica having a particle diameter ratio of 1.07 and a relative standard deviation of 0.09) in proportions shown in Table 11 were dried, melt-extruded and quenched to be solidified so as to obtain unstretched films. The unstretched films were stretched to 3.2 times in a longitudinal direction at 120° C. and then to 3.3 times in a transverse direction at 130° C., and heat-set at 180° C. to obtain unstretched films.

Each of the obtained films had a thickness of 25 μm, a glass transition temperatures (Tg) of 81° C., the highest peak temperature of loss elastic modulus (Te) of 100° C. and a Te–Tg of 19° C. Further, the refractive index in a thickness direction of each of the films was 1.520, the quantity of an extract with ion exchange water was 0.12 mg/$inch^2$, and the center line average roughness (Ra) is shown in Table 11.

The evaluation results are shown in Table 12. Cans made by using the films of the present invention are satisfactory in terms of resistance to heat embrittlement, retort resistance and impact resistance and have improved taste-and-flavor retainabilities, particularly taste-and-flavor retainabilities after a retort treatment, and excellent deep drawability.

TABLE 10

| | | amount of | contents of metals in film | | | |
|---|---|---|---|---|---|---|
| Te (° C.) | Te–Tg (° C.) | acetaldehyde (ppm) | A (ppm) | Sb (mmol %) | Sb + M + P (mmol %) | (Sb + M)/P (mmol %/mmol %) |
| Ex. 12 | 102 | 21 | 10 | 10 | 40 | 60 | 4.0 |
| Ex. 13 | 103 | 21 | 12 | " | 50 | 75 | " |
| Ex. 14 | 100 | 22 | 8 | 0 | 30 | 45 | " |
| Ex. 15 | 99 | 16 | 10 | 10 | 40 | 60 | " |
| Ex. 16 | 109 | 29 | 10 | " | " | " | " |
| Ex. 17 | 102 | 21 | 3 | 5 | 30 | 45 | " |
| Ex. 18 | 102 | 21 | 10 | 10 | 40 | 60 | " |

Notes)
A: total amount of alkali-metal elements remaining in film
Sb: concentration of Sb metal element remaining in film
M: concentration of catalyst metal element other than Sb remaining in film
P: concentration of phosphorus element remaining in film

TABLE 11

| | lubricant A (porous silica) | | lubricant B (spherical silica) | | |
|---|---|---|---|---|---|
| | average particle diameter ($\mu$m) | content (wt %) | average particle diameter ($\mu$m) | content (wt %) | Ra (nm) |
| Ex. 19 | 0.3 | 0.5 | 0.1 | 0.1 | 10 |
| Ex. 20 | 0.6 | 0.1 | 0.1 | 0.5 | 12 |
| Ex. 21 | 0.8 | 0.05 | 0.1 | 0.2 | 12 |
| Ex. 22 | 0.8 | 0.1 | 0.1 | 0.2 | 14 |
| Ex. 23 | 0.8 | 0.1 | 0.5 | 0.02 | 15 |
| Ex. 24 | 1.5 | 0.1 | 0.5 | 0.1 | 22 |
| Ex. 25 | 2.3 | 0.02 | 0.5 | 0.1 | 31 |

TABLE 12

| | deep drawability | | impact resistance | resistance to heat embrittlement | retort resistance | taste-to-flavor retainabilities | | overall evaluation |
|---|---|---|---|---|---|---|---|---|
| | 1 | 2 | | | | 1 | 2 | |
| Ex. 19 | ○ | ○ | ○ | ○ | ○ | ◉ | ◉ | ◉ |
| Ex. 20 | ○ | ○ | ○ | ○ | ○ | ◉ | ◉ | ◉ |
| Ex. 21 | ○ | ○ | ○ | ○ | ○ | ◉ | ◉ | ◉ |
| Ex. 22 | ○ | ○ | ○ | ○ | ○ | ◉ | ◉ | ◉ |
| Ex. 23 | ○ | ○ | ○ | ○ | ○ | ◉ | ◉ | ◉ |
| Ex. 24 | ○ | ○ | ○ | ○ | ○ | ◉ | ○ | ○ |
| Ex. 25 | ○ | ○ | ○ | ○ | ○ | ◉ | ○ | ○ |

The polyester film to be laminated onto a metal plate and molded of the present invention has improved taste-and-flavor retainabilities, particularly taste-and-flavor retainabilities after a retort treatment, without losing the excellent heat resistance, impact resistance and retort resistance of copolyester and does not experience a reduction in moldability, when laminated onto a metal plate and subjected to a can making process such as deep drawing for making a metal can. Therefore, it is extremely useful as a film for a metal container.

What is claimed is:

1. A biaxially oriented polyester film to be laminated onto a metal plate and molded, (A) which comprises a copolyester comprising (a) terephthalic acid in an amount of 82 to 100 mol % and 2,6-naphthalenedicarboxylic acid or a combination of 2,6-naphthalenedicarboxylic acid and other dicarboxylic acid in an amount of 0 to 18 mol % of the total of all dicarboxylic acid components and (b) ethylene glycol in an amount of 82 to 100 mol % and cyclohexanedimethanol or a combination of cyclohexanedimethanol and other diol in an amount of 0 to 18 mol % of the total of all diol components, having (c) a glass transition temperature of 78° C. or more and (d) a melting point of 210 to 250° C., and containing (e) porous silica particles with a pore volume of 0.5 to 2.0 ml/g which are agglomerates of primary particles having an average particle diameter of 0.001 to 0.1 $\mu$m; and (B) which has the following relationship between the highest peak temperature (Te, °C.) of loss elastic modulus and the glass transition temperature (Tg, °C.):

$$Te-Tg \leq 30,$$

wherein the copolyester also contains inert spherical particles which have a particle diameter ratio wherein the (long diameter/short diameter) ratio of 1.0 to 1.2 and an average particle diameter of 2.5 $\mu$m or less and which are not substantially agglomerated.

2. The film of claim 1, wherein all the dicarboxylic acid components of the copolyester consist of terephthalic acid and 2,6-naphthalenedicarboxylic acid and all the diol components of the copolyester consist of ethylene glycol.

3. The film of claim 1, wherein the glass transition temperature (Tg) of the copolyester is in the range of 78 to 90° C.

4. The film of claim 1, wherein the melting point of the copolyester is in the range of 210 to 245° C.

5. The film of claim 1, wherein a concentration of terminal carboxyl groups of the copolyester is 40 eq/$10^6$ g or less.

6. The film of claim 1, wherein a content of acetaldehyde in the copolyester is 15 ppm or less.

7. The film of claim 1, wherein the electric resistivity of the copolymer, as a melt at 290° C., is in the range of $5 \times 10^6$ to $1 \times 10^9$ $\Omega \cdot$cm.

8. The film of claim 1, wherein the average particle diameter of the porous silica particle agglomerates is in the range of 0.1 to 5 $\mu$m.

9. The film of claim 1, wherein the content of the porous silica particles is 0.01 to 1 wt %.

10. The film of claim 1, wherein the inert spherical particles are silica particles.

11. The film of claim 1, wherein the average particle diameter of the inert spherical particles is smaller than that of the porous silica particles and is in the range of 0.05 to 0.8 $\mu$m.

12. The film of claim 1, wherein the content of the inert spherical particles is in the range of 0.01 to 1 wt %.

13. The film of claim 1, which has the following relationship between the highest peak temperature (Te) of loss elastic modulus and the glass transition temperature (Tg):

$$15 \leq Te-Tg \leq 25.$$

14. The film of claim 1, which has a refractive index in a film thickness direction of 1.500 to 1.545.

15. The film of claim 1, which has a center line average surface roughness (Ra) of 35 nm or less.

16. The film of claim 1, which has a center line average surface roughness of 15 nm or less.

17. The film of claim 1, wherein the quantity of an extract obtained by an extraction treatment with ion exchange water at 121° C. for 2 hours is 0.5 mg/inch$^2$ (0.0775 mg/cm$^2$) or less.

18. The film of claim 1, which has a thickness of 6 to 75 μm.

19. A process for the production of a laminate comprising the step of laminating the film of claim 1 on a metal plate.

20. A process for making a metal can comprising the step of deep drawing the laminate of claim 19.

* * * * *